Figure 1:
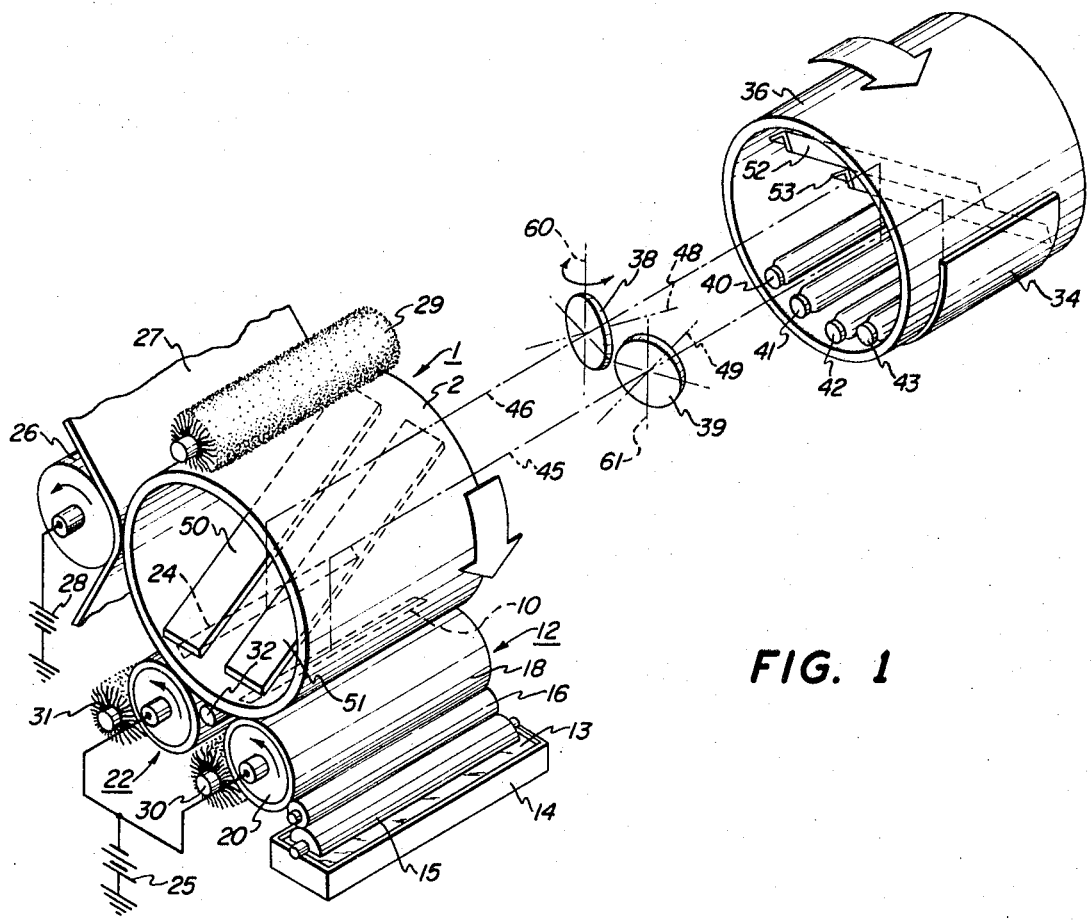

United States

Jackson

[11] 3,730,620

[45] May 1, 1973

[54] FOCUSING METHOD
[75] Inventor: Earl V. Jackson, Penfield, N.Y.
[73] Assignee: Xerox Corporation, Stamford, Conn.
[22] Filed: Dec. 29, 1970
[21] Appl. No.: 102,460

[52] U.S. Cl. .......................355/8, 350/202, 355/49, 355/52
[51] Int. Cl. ..............................................G03g 15/04
[58] Field of Search........................355/3, 8, 52, 46, 355/49, 54; 350/43, 202; 353/69, 70

[56] References Cited

UNITED STATES PATENTS

| 3,563,637 | 2/1971 | Ferguson | 355/46 X |
| 3,468,230 | 9/1969 | Bellows | 355/52 X |

OTHER PUBLICATIONS

Langford, Basic Photography, 1965, pages 94–97 and plates 22, 23, and 28.
Bausch and Lomb Optical Company, Ophthalmic Lenses: Their History, Theory, and Application, 1935, p. 84.

*Primary Examiner*—Samuel S. Matthews
*Assistant Examiner*—Kenneth C. Hutchison
*Attorney*—Paul M. Enlow, James J. Ralabate, David C. Petre and Barry J. Kesselman

[57] ABSTRACT

A method for presenting focused images at a predetermined magnification in an optical system having narrow format and fixed object and image planes. The lens with a nominal focal length suitable for the system is manipulated according to the invention by rotating it to change the total conjugate of the optical system while maintaining a fixed physical distance along the principal ray of the imaging system between the object and image planes.

3 Claims, 2 Drawing Figures

PATENTED MAY 1 1973　　3,730,620

INVENTOR.
EARL V. JACKSON
BY Barry Jay Kesselman
ATTORNEY

FOCUSING METHOD

This invention relates to optical systems and more particularly to precise focusing techniques.

Optical systems exist with constraints in them that prevent the adjustment of physical distance between an object plane and an image plane. Such constraints may occur in office copying type machinery or other apparatus that for one reason or another has preset object and image separations and no internal mechanism such as mirrors or prisms to make finite changes in the total optical conjugate of the system. One somewhat constrained system was recently described in copending application Ser. No. 887,453, filed on Dec. 22, 1969 in the names of S. Hoffman et al. This system utilized a multiple exposure imaging apparatus for forming images by the photoelectrophoretic imaging technique invented and described in U.S. Pat. Nos. 3,383,993; 3,384,565 and 3,384,566.

These patents disclose how to produce a visual image at one or both of two electrodes between which a photoelectrophoretic particle suspension is placed. The particles are photosensitive and appear to undergo a net change in charge polarity or a polarity alteration by interaction with one of the electrodes upon exposure to activating electromagnetic radiation. The particles will migrate from one of the electrodes under the influence of an electric field when struck with energy of a wavelength within the spectral response curve of the particles.

Therefore, it is an object of this invention to improve optical apparatus. Another object of this invention is to improve resolution capabilities of optical apparatus having narrow formats. Still another object of this invention is to improve resolution capabilities of multiple re-exposure systems. A further object of this invention is to improve resolution of optical apparatus having a fixed total physical distance along the principal ray of the imaging system between the object and image planes. Yet another object is to improve optical systems for multiple re-imaging at fixed points and at fixed distances from each other. A further object is to reduce system costs by enabling moderate tolerances in optical lens components within a constrained optical system. Another object is to improve optical systems for use in single pass photoelectrophoretic imaging apparatus.

Figure 2:
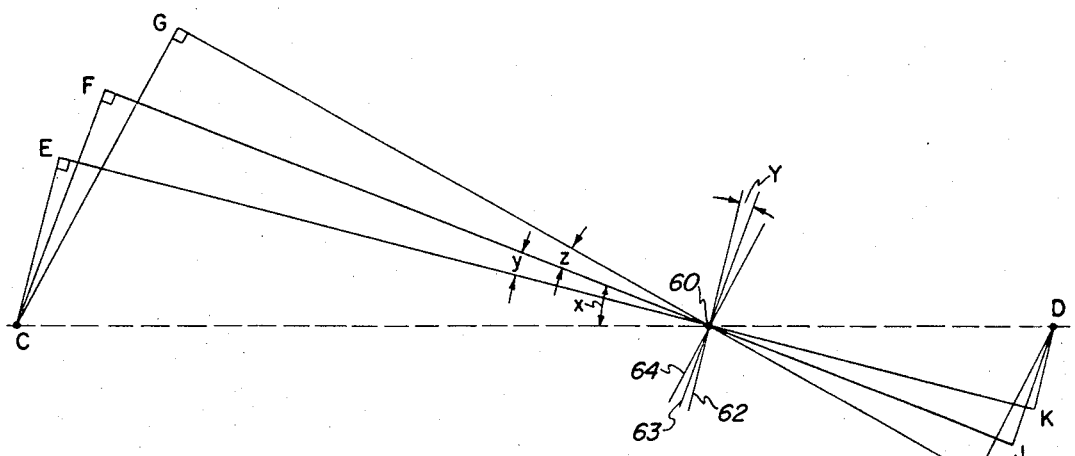

These and other objects and advantages of this invention will become apparent to those skilled in the art after reading the following description taken in conjunction with the accompanying drawings wherein:

FIG. 1 is a schematic isometric representation of an embodiment of a machine for forming images utilizing this invention; and FIG. 2 is a diagrammatic illustration of this invention.

This is a method for correcting small focal length differences from that which is required either within a single imaging system or between lenses in a multiple imaging system. For example, in a multiple imaging system, by rotating the lens through a predetermined angle, the apparent focal length of one lens can be made exactly equal to that of a lens in another of the imaging systems. Even for lenses of nominally equal focal length, the exact focal length is probably different and this invention provides a correction factor in an optical system by utilizing only the lenses. This eliminates extremely high lens manufacturing tolerances for highly constrained optical systems.

There are certain terms of art used in conjunction with the photoelectrophoretic imaging process shown in the embodiment of FIG. 1 which should be defined. The "injecting electrode" is so named because it is thought to inject the electrical charges into activating photosensitive particles during imaging. The term "photosensitive" for the purpose of this disclosure refers to the property of a particle, which once attracted to an injecting electrode, will alter its polarity and migrate away from the electrode under the influence of an applied electric field when exposed to activating electromagnetic radiation. The term "suspension" may be defined as a system having solid particles dispersed in a solid, liquid or gas. Nevertheless, the suspension used in the disclosures herein is of the general type having a solid suspended in a liquid carrier. The term "imaging electrode" is used to describe that electrode which interacts which the injecting electrode through the suspension and which once contacted by activated photosensitive particles will not inject sufficient charges into them to cause them to migrate from the imaging electrode surface. The imaging electrode is covered with a dielectric surface composed of a material in volume resistivity preferably in the order of $10^7$ or greater ohm-cm. and a conductive core member which is preferably a resilient material such as electrically conductive rubber used to give flexibility to the imaging electrode.

For photoelectrophoretic imaging to occur it is thought that these steps, not necessarily in the sequence presented, take place: (1) migration of the particles toward the injecting electrode due to the influence of an electric field, (2) the generation of charge carriers within the particles when struck by activating radiation within their spectral response curve, (3) particle deposition on or near the injecting electrode surface, (4) phenomena associated with the forming of an electrical junction between the particles and injecting electrode, (5) particle charge exchange with the injecting electrodes, (6) electrophoretic migration toward the imaging electrode, (7) particle disposition on the imaging electrode. This leaves an optically positive image on the contacted surface of the injecting electrode.

The invention herein is described and illustrated in the specific embodiment, in this case a photoelectrophoretic imaging device, having specific components listed for carrying out the functions of the apparatus. Nevertheless, the invention need not be thought of as being confined to such a specific showing and should be construed broadly within the scope of the claims. Any and all equivalents known to those skilled in the art can be substituted for the specific apparatus or steps disclosed as long as the substituted apparatus or steps achieve a similar function. It may be that other processes or apparatus will be invented having similar needs to those fulfilled by the apparatus and methods described and claimed herein, and it is the intention to describe an invention for possible use in apparatus and systems other than the embodiment shown.

Other terms referred to herein relating to the optical system are generally meant to have the following definitions. A slit, whether object or image, refers to a narrow format for projection having one dimension substantially larger than the other. Such a slit is shown in FIG. 1 by reference numeral 10. The axis of rotation is the axis through the center of a lens which is optically parallel to the long dimension of the object slit or object format. Such an axis is illustrated by the reference numeral 60 in the figures.

The object plane is the optical plane which when projected through the lens presents a focused image at its conjugate image plane. It is the plane at which an object to be imaged is positioned for projection. The image plane is the plane at which the focused imaging light rays are projected from the object and whereat a photosensitive material may be positioned and exposed to such light rays. In the figures one such image plane is the slit 10. Object and image positions are selected at the respective object and image planes of the imaging system.

The principal ray of the optical imaging system is the ray from the center of the slit passing through the centers of the iris and pupils of a lens.

The schematic representation of FIG. 1 shows a photoelectrophoretic imaging apparatus having an injecting electrode 1 with a coating 2 of transparent conductive material such as tin oxide on the outside surface of the transparent glass member. Such a combination is commercially available under the name of NESA glass from Pittsburgh Plate Glass Company of Pittsburgh, Pa. However, other electrically conductive coatings over transparent substances are suitable for use herein. At a first imaging area 10, an imaging electrode 12 interfaces with the outer surface of the injecting electrode 1. As shown, the imaging electrode carries imaging suspension 13 from the suspension supply housing 14 via a suspension application system having a metering roll 15 and an applicator roll 16. The imaging suspension is applied to the surface of the imaging electrode between the injecting electrode 1 and the imaging electrode 12 at the first imaging area 10.

The imaging electrode 12 has a high dielectric surface 18 overcoated on a conductive flexible inner core 20. A second imaging electrode 22 interfaces with the outer surface of the injecting electrode at a second imaging area 24. Both of the imaging electrodes are connected respectively to the negative terminal of electrical sources 25. The injecting electrode 1 is shown schematically connected to ground so that a field exists between the two imaging electrodes on the one hand and the injecting electrode on the other as is the custom for the photoelectrophoretic imaging process. Further, the second imaging electrode 22 has a sprayer 32 operatively associated with it to spray carrier material onto the surface of the second imaging electrode 22. This aids in selectively removing particles of the suspension from the outer surface of the injecting electrode under the imaging conditions provided by the optical system and electrical source. It has been found that the addition of materials similar to the liquid carrier of the imaging suspension aids in the migration of particles of the suspension away from the injecting electrode in the second imaging area 24. Interfacing with the outer surface 2 of the injecting electrode 1 downstream or further along the path of movement of the injecting electrode is the transfer roller 26 and transfer support sheet 27. The transfer roller is electrically connected to a source 28 for causing an opposite polarity to the two imaging electrodes 20 and 22 with their electrical source. It is the function of the transfer electrode to electrophoretically transfer the imaging suspension from the surface 2 of the injecting electrode 1 to a support material which is used as the final image support media. A cleaning brush 29 is placed in contact with the outer surface of the injecting electrode 1 to remove any residual suspension left on the injecting electrode after transfer has been completed. Similarly, cleaning brushes 30 and 31 contact the imaging electrodes 12 and 22 respectively, to clean their surfaces after the interface with the injecting electrode.

The integrated dual optical system shown herein presents superposed imagewise electromagnetic radiation at each of the plurality of imaging areas denoted by the numerals 10 and 24. The image is of contiguous portions of the document 34 placed on the document drum 36 at the object plane of the plurality of lenses 38 and 39. Radiation energy or illumination is supplied by light sources 40–43. The two reference lines 45 and 46 shown in FIG. 1 represent the principal ray from the object plane to the image plane of the optical system. It should be noted that the document 34 is positioned on a surface of the object drum 36 which passes through the object plane of each of the two lenses 38 and 39. The outer surface 2 of the injecting electrode 1 moves through the image plane of the two lenses at the imaging areas 10 and 24 respectively. The principal rays 45 and 46 are not the optical axes of each of the lenses. The optical axes, in fact, are shown by the reference lines 48 and 49. With the dual optical system are equal sets of mirrors including plane mirrors 50 and 51 and roof mirrors 52 and 53 shown in the respective optical path of the two lenses 38 and 39. The lenses 38 and 39 are mounted for rotational adjustments about their respective axes of rotation 60 and 61.

Although only two optical systems are shown, it is possible for three or more to be coordinated in the same manner as shown here to enable multiple imaging passes with a single revolution of the injecting electrode past a plurality of imaging electrodes equal to the number of coordinated optical systems. The optical systems function to present multiple exposures of the document from various places of the object drum to various preselected places of the injecting electrode so that the same portions of the document are projected at each of the various prepositions on the injecting electrode which are the predetermined image planes. In this three mirrored multiple imaging system, there is the ability to take two alike curved surfaces functioning as an object and an image plane and by moving them in synchronous motion produce an image of the objects. The image is optically suitable for transfer to become a right reading final image on a sheet of support material. The object drum and the image drum can be one continuous transparent cylinder if the magnification of the system is set for one to one or two separate cylinders as shown in FIG. 1. If the cylinders are used and one to one magnification is desired they are of the same diameter and are mechanically locked to be rotated at the same surface velocity making a practical multiple scanning system.

For magnifications different from 1— to —1, the image cylinder radius is equal to the product of the object cylinder radius and the optical magnification. Angular velocity and the angle between the imaging stations are equal on both cylinders. Therefore, in a multiple slit-scan system, the angular velocity of the object and image cylinders are equal for all magnifications and the radii of the cylinders are in the proportions of the magnifications. For magnifications other than one to one, the chord length or distance between the object slits and a distance between the image slits are different.

In order to have high quality images there must be precise magnification matching of the various optical systems. Another requirement for a good scanning optical system is that the focused image be projected nearly tangentially to the imaging cylinder at the imaging slits to insure the precise matching of multiple imaging systems or the focusing of the single image. These requirements are particularly hard to achieve in an optical system constrained to a fixed total physical distance separation along the principal ray between the object and image planes. It is necessary to make minor adjustments in the total conjugate within the system in order to avoid impractical tolerances on the lenses or the system and yet enable a high quality image.

FIG. 2 diagrammatically illustrates how this adjustment is accomplished in the systems improved by this invention. One set of slits such as the imaging slit 24 and the object slit which is imaged thereat are located at points $C$ and $D$ in FIG. 2. The total unfolded distance between the two slits is $CD$. The normal, total conjugate, is $CD \cos x = FJ$. If the lens 38 is turned through an angle $Y$ about the axis of rotation 60, the total conjugate distance equals $EK = CD \cos (X-Y)$. Similarly, if the lens is turned through an angle $Z$, then the total conjugate equals $GH = CD \cos (X+Z)$. It can be seen $EK$ is greater than $FJ$ and $GH$ is less than $FJ$. In this manner, the total conjugate of the system is adjustable positively or negatively to present a focused image of the object even though there is a fixed physical distance between object and image planes.

The image is limited to the narrowed format indicated by the point at reference $C$ in FIG. 2. Likewise, the object projected is that indicated by the point representing the slit at reference $D$. $CE$, $CF$ and $CG$ are projections of the image plane extended for positions 62, 63 and 64 respectively of the lens. $DH$, $DJ$ and $DK$ are the respective object plane projections. If we consider line $FJ$ as the nominal total conjugate, it is clear how the total conjugate can be lengthened, such as $EK$, or shortened, such as $GH$. The line $CD$ is the fixed distance principal ray of the object and image positions at the object and image slits. Note that the rotation of the lens about the axis 60 to achieve the total conjugate adjustment is parallel to the long format of the slits at C and D. The general definition of the total conjugate as shown and described above is the distance parallel to the optical axis, which is perpendicular to the nodal plane of the lens (62, 63 or 64), from an object plane of the lens to a corresponding image plane of the lens at a particular magnification.

A specific example of the error correction capability of this invention may be helpful for illustrative purposes. With the slits at $C$ and $D$ as shown in FIG. 2 equal to 0.250 inch and the distance $CD$ equal to the 39.844 inches, the total conjugate at the nominal lens position 63 is $CD \cos x$. If $x$ equals $17°30'$ then $CD \cos 17°30'A$ equals 38.0. If the lens is turned through an angle $Y$, the total conjugate becomes $EK$ which equals $CD \cos (17°30'-Y)$.

If one considers this system for imaging a document of standard size width of 9 inches in a constrained system such as that shown in FIG. 1 with the following parameters:
- magnification 1:1
- lens $f/4.5$ with a 9.5 inch focal length
- an angle $x$ equal to $17°30'$
- an angle of tilt $Y$ equal to $1.75°$ (to achieve a 1 percent total conjugate correction), and
- a slit width 10 equal to 0.250 inch the resulting errors are maximum. The resulting projection error due to a $Y$ focus shift is proportional to $Y$ and reaches a maximum of 0.0008 inch. The resulting projection error due to a magnification change at the edge of the slit (4.5 inches off axis (reference line 45) is proportional to both angle $Y$ and the document width and reaches a maximum of 0.0018 inches. Therefore, the total projection error would equal a maximum of 0.0026 inch which by itself would enable a resolution of about 15 lines per millimeter. If the lens had a 1 percent uncorrected focal length error for the constrained system, the image would be focused 0.18 inch from the image plane resulting in a much larger total projection error.

This system provides a method of matching magnifications within a constrained optical system by adjusting the apparent focal length of each of the lenses. This is particularly useful in a production situation where it is desirable to prefix a distance such as $CD$ in FIG. 2. Of course, the specific changes, values and ranges must be determined with regard to the magnification, total conjugate, slit width, format length and separation of the image from the optical axis. The example above cites one set of parameters and the adjustment suggested to achieve the results of this invention.

While this invention has been described with reference to the structures disclosed herein and while certain theories have been expressed, it is not confined to the details set forth and this application is intended to cover such modifications or changes as may come within the purposes of the improvement and the scope of the following claims.

What is claimed is:

1. A method for setting up constrained narrow format scanning optical projection systems for producing focused images for superimposing object data on an image member including
    selecting a first narrow format constrained scanning optical projection system for projecting moveable object data from a first fixed object position to a first fixed image position having a fixed physical distance along the principal ray between them;
    placing a first lens of the approximately proper focal length for the selected object and image positions at a predetermined position between the object and image positions for projecting a flowing image at the first image position;
    selecting a second narrow format constrained scanning optical projection system for projecting moveable object data from a second fixed object position to a second fixed image position having a fixed physical distance along the principal ray between them;

placing a second lens of the approximately proper focal length for the selected object and image positions at a predetermined position within the second scanning optical system such that it projects the same object data on the same position of the image member as does the first scanning optical system;

turning at least one of said lenses through an angle about an axis through its center and optically parallel to the long dimension of the narrow format at its predetermined position in order to modify its apparent focal length within its optical system to present a matched, focused image relative to the other optical system.

2. The system of claim 1 wherein the lens is turned through a maximum angle of 1.75° about an axis through its center and optically parallel to the long dimension of the narrow format.

3. The system of claim 1 wherein the object format is a maximum of 9 inches by 0.25 inch.

* * * * *